(12) United States Patent
Kasahara et al.

(10) Patent No.: US 12,021,261 B2
(45) Date of Patent: Jun. 25, 2024

(54) STACKED SECONDARY BATTERY

(71) Applicants:Panasonic Corporation, Kadoma (JP); SANYO Electric Co., Ltd., Daito (JP)

(72) Inventors: Hideo Kasahara, Osaka (JP); Ryosuke Iwata, Hyogo (JP); Ryoichi Wakimoto, Hyogo (JP)

(73) Assignees: PANASONIC HOLDINGS CORPORATION, Osaka (JP); SANYO Electric Co., Ltd., Osaka (JP)

( * ) Notice: Subject to any disclaimer, the term of this patent is extended or adjusted under 35 U.S.C. 154(b) by 499 days.

(21) Appl. No.: 17/424,216

(22) PCT Filed: Nov. 27, 2019

(86) PCT No.: PCT/JP2019/046297
§ 371 (c)(1),
(2) Date: Jul. 20, 2021

(87) PCT Pub. No.: WO2020/158137
PCT Pub. Date: Aug. 6, 2020

(65) Prior Publication Data
US 2022/0094020 A1 Mar. 24, 2022

(30) Foreign Application Priority Data
Jan. 29, 2019 (JP) ................................. 2019-012906

(51) Int. Cl.
*H01M 50/451* (2021.01)
*H01M 10/0585* (2010.01)
(Continued)

(52) U.S. Cl.
CPC ..... *H01M 50/451* (2021.01); *H01M 10/0585* (2013.01); *H01M 50/409* (2021.01);
(Continued)

(58) Field of Classification Search
CPC ........... H01M 10/045; H01M 10/0525; H01M 10/0583; H01M 10/0585; H01M 10/4235;
(Continued)

(56) References Cited

U.S. PATENT DOCUMENTS

2007/0117008 A1 5/2007 Kaneko et al.
2008/0305398 A1 12/2008 Komiya
(Continued)

FOREIGN PATENT DOCUMENTS

EP 3312915 A1 4/2018
JP 2007-141714 A 6/2007
(Continued)

OTHER PUBLICATIONS

Machine translation WO2019201690A1 (Year: 2019).*
(Continued)

*Primary Examiner* — Victoria H Lynch
(74) *Attorney, Agent, or Firm* — WHDA, LLP

(57) ABSTRACT

A stacked secondary battery having an electrode body in which at least one positive and at least one negative plate are stacked, with a multilayered separator interposed, said separator including two porous layers of different materials; and an outer packaging case housing an insulating holder and an electrolyte together, said insulating holder housing the electrode body and being formed of overlapping sheets comprises an insulating material. The outer packaging case has a bottom surface, a plurality of side walls that are provided standing upright from the bottom surface, and an opening that is opposite from the bottom surface. In at least one separator, a section that is exposed from end surfaces of active material mixture layers and metal foil-comprising core bodies of the positive plate and the negative plate is in contact with the vicinity of a bottom line of a valley section that is formed from the sheet.

12 Claims, 6 Drawing Sheets

(51) Int. Cl.
  *H01M 50/409* (2021.01)
  *H01M 50/414* (2021.01)
  *H01M 50/434* (2021.01)
  *H01M 50/466* (2021.01)
  *H01M 50/491* (2021.01)
  *H01M 50/586* (2021.01)
  *H01M 50/593* (2021.01)

(52) U.S. Cl.
  CPC ....... *H01M 50/414* (2021.01); *H01M 50/434* (2021.01); *H01M 50/466* (2021.01); *H01M 50/491* (2021.01); *H01M 50/586* (2021.01); *H01M 50/593* (2021.01)

(58) Field of Classification Search
  CPC ...... H01M 4/134; H01M 4/366; H01M 4/386; H01M 50/103; H01M 50/15; H01M 50/409; H01M 50/414; H01M 50/431; H01M 50/434; H01M 50/446; H01M 50/449; H01M 50/451; H01M 50/466; H01M 50/491; H01M 50/586; H01M 50/593; Y02E 60/10; Y02P 70/50
  See application file for complete search history.

(56) References Cited

U.S. PATENT DOCUMENTS

| | | |
|---|---|---|
| 2010/0203373 A1 | 8/2010 | Kawase et al. |
| 2017/0047571 A1 | 2/2017 | Iwasaki et al. |
| 2018/0219216 A1* | 8/2018 | Choi .................. H01M 4/1395 |

FOREIGN PATENT DOCUMENTS

| | | |
|---|---|---|
| JP | 2008-204706 A | 9/2008 |
| JP | 2009-26704 A | 2/2009 |
| JP | 2013-114764 A | 6/2013 |
| JP | 2014-41724 A | 3/2014 |
| JP | 2015-228359 A | 12/2015 |
| KR | 10-2015-0035079 A | 4/2015 |
| WO | WO-2019201690 A1 * | 10/2019 .......... H01M 2/0275 |

OTHER PUBLICATIONS

The Extended European Search Report dated Jul. 19, 2022, issued in counterpart to EP Application No. 19912849.7. (12 pages).
International Search Report dated Mar. 3, 2020, issued in counterpart application No. PCT/JP2019/046297 (2 pages).

* cited by examiner

STACKED SECONDARY BATTERY

TECHNICAL FIELD

The present disclosure relates to a stacked secondary battery.

BACKGROUND ART

Electric storage devices are used as power supplies for driving electric vehicles (EV), hybrid electric vehicles (HEV, PHEV), and the like, and as power supplies for electronic equipment. As such electric storage devices, secondary batteries such as lithium-ion secondary batteries are widely utilized.

As secondary batteries, a stacked secondary battery is known in related art, the stacked secondary battery having a stacked electrode assembly in which a plurality of positive electrode plates and negative electrode plates which are all electrode plates are stacked via separators, and an exterior body which stores the electrode assembly.

Patent Literature 1 discloses a stacked secondary battery in which end portions of a plurality of separators which protrude outside from end portions of positive electrodes and negative electrodes are fixed with an adhesive tape so that the end portions rise and overlap with each other. This overlapping of the plurality of separators prevents shifting of the electrodes and prevents invasion of foreign matters between the electrodes and the separators.

CITATION LIST

Patent Literature

PATENT LITERATURE 1: Japanese Unexamined Patent Application Publication No. 2008-204706

SUMMARY

Technical Problem

By the way, there is a case where, in a stacked secondary battery, an electrode assembly is stored in an insulating holder made from an insulating material to prevent short-circuit by contact between a metal exterior case and the electrode assembly inside the exterior case, and the electrode assembly, the insulating holder and an electrolyte are stored in the exterior case. In this event, there is a case where a gap is generated between an inner surface of the insulating holder and an end face of an electrode plate, and the electrolyte exists as a surplus liquid at the gap. While it is possible to dispose end portions of separators at the gap to make this surplus liquid penetrate into the electrode assembly, if the gap is large, it is difficult to make the surplus liquid penetrate into most part of the electrode assembly. This problem is desired to be solved, because this becomes a cause of degrading capacity retention of the secondary battery.

It is an advantage of the present disclosure to provide a stacked secondary battery which allows a surplus liquid of an electrolyte existing between an insulating holder and an end portion of an electrode assembly to more easily penetrate into most part of the electrode assembly.

Solution to Problem

A stacked secondary battery which is one aspect of the present disclosure is a stacked secondary battery having an electrode assembly in which at least one positive electrode plate and at least one negative electrode plate are stacked via separators in a plurality of layers including two porous layers formed with different materials, and an exterior case which is formed by folding a sheet formed with an insulating material so that the sheet overlaps with each other and which stores an insulating holder which stores the electrode assembly, and an electrolyte together, the exterior case having a bottom face, a plurality of side walls rising from the bottom face, and an opening which faces the bottom face and which is surrounded by the plurality of side walls, and portions of at least one of the separators, which are exposed from end faces of cores formed with a metallic foil and active material mixture layers at the positive electrode plate and the negative electrode plate, is in contact with a vicinity of a base line of a valley portion formed by the sheet.

Advantageous Effect of Invention

According to one aspect of the present disclosure, it is possible to allow a surplus liquid of an electrolyte existing between an insulating holder and an end portion of an electrode assembly to more easily penetrate into most part of the electrode assembly.

DESCRIPTION OF EMBODIMENTS

Figure 1:
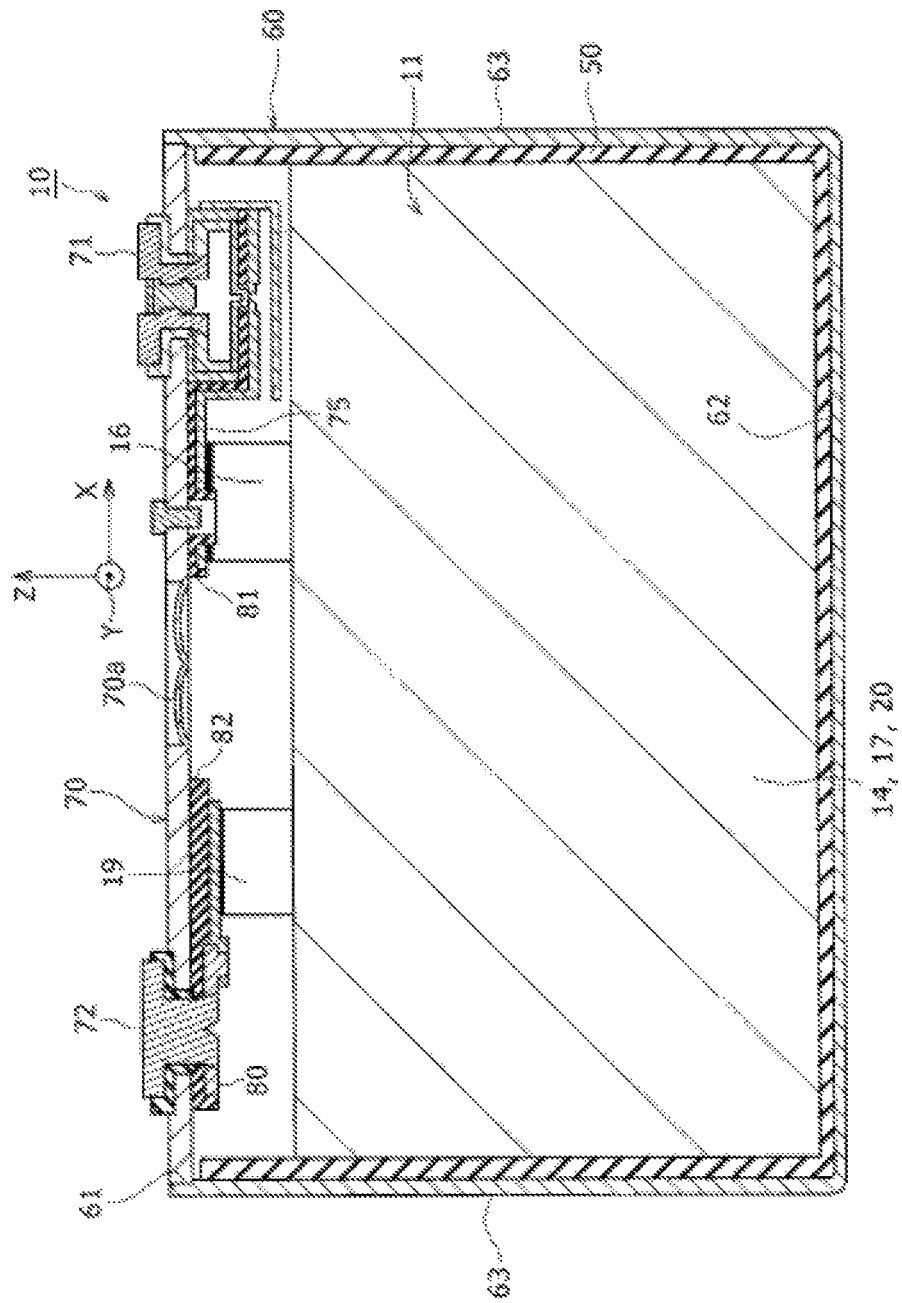
FIG. 1 is a sectional view of a stacked secondary battery in one example of an embodiment.

A stacked secondary battery in one example of an embodiment will be described in detail below. The drawings which will be referred to in description of the embodiment are schematically illustrated, and a scale, or the like, of components illustrated in the drawings may be different from an actual scale. A specific scale, or the like, should be judged in view of the following description. In the present specification, "substantially" means practically as well as completely. For example, the meaning of "substantially the same" includes "practically the same" as well as "completely the same". Further, a term of an "end portion" means an end of an object and its vicinity. Still further, the shape, materials, the number, or the like, which will be described below are examples and can be changed in accordance with specifications of the stacked secondary battery. Description will be provided below while the same reference numerals will be assigned to similar components.

A stacked secondary battery 10 in one example of the embodiment will be described below using FIG. 1 to FIG. 6. FIG. 1 is a sectional view of the stacked secondary battery 10 in one example of the embodiment. In the following description, the stacked secondary battery 10 will be described as a secondary battery 10. In the following description, description will be provided assuming that a sealing assembly 70 side is an upper side, and an opposite side of the sealing assembly 70 is a lower side for explanatory convenience. FIG. 1, FIG. 2, FIG. 5 and FIG. 6 indicate a longitudinal direction (lateral direction) of an exterior case 60, an insulating holder 50 and an electrode assembly 11 with X, a thickness direction with Y and a vertical direction which is a height direction with Z. X, Y and Z are orthogonal to each other.

As illustrated in FIG. 1, the secondary battery 10 has a rectangular shape and comprises an electrode assembly 11 as an electric storage element, an insulating holder (electrode assembly holder) 50 which stores the electrode assembly 11, an exterior case 60, and a sealing assembly 70. The electrode assembly 11 includes at least one positive electrode plate 14 (FIG. 5), at least one negative electrode plate 17 (FIG. 5) and at least one separator 20 (FIG. 5) and has a stacked structure in which the positive electrode plates 14 and the negative electrode plates 17 are stacked via the separators 20. The positive electrode plate 14 and the negative electrode plate 17 correspond to electrodes. For example, the electrode assembly 11 includes a plurality of positive electrode plates 14, a plurality of negative electrode plates 17, and a plurality of separators 20. The separator 20 has a plurality of layers including two porous layers formed with different materials as will be described later.

As will be described later, the insulating holder 50 has a substantially cuboid shape having a bottom portion and an open upper end and stores the electrode assembly 11. The insulating holder 50 is formed by folding, for example, an insulating sheet 51 (FIG. 3, FIG. 4) formed with an insulating material so that part of the insulating sheet 51 overlaps with each other.

The exterior case 60 has a substantially cuboid shape having a bottom face 62, a plurality of (for example, four) side walls 63 rising from the bottom face 62, and an upper end opening 61 facing the bottom face 62 and surrounded by the plurality of side walls 63. The exterior case 60 stores the insulating holder 50 which stores the electrode assembly 11, and an electrolyte together.

The sealing assembly 70 is a plate-like member which closes the opening 61 formed at the exterior case 60. The exterior case 60 and the sealing assembly 70 constitute a battery case. A positive electrode terminal 71 and a negative electrode terminal 72 which are separate from each other in a longitudinal direction X of the sealing assembly 70 are fixed at the sealing assembly 70 while part of the positive electrode terminal 71 and the negative electrode terminal 72 are exposed to outside of the sealing assembly 70. The exterior case 60 and the sealing assembly 70 are preferably formed with a metal and, for example, preferably formed with aluminum or an aluminum alloy.

As the separator 20 (FIG. 5), a porous sheet having a plurality of porous layers having ion permeability and insulation property is used. The same sheet can be used as the separators 20. The secondary battery 10 is preferably a lithium-ion battery.

Figure 5:
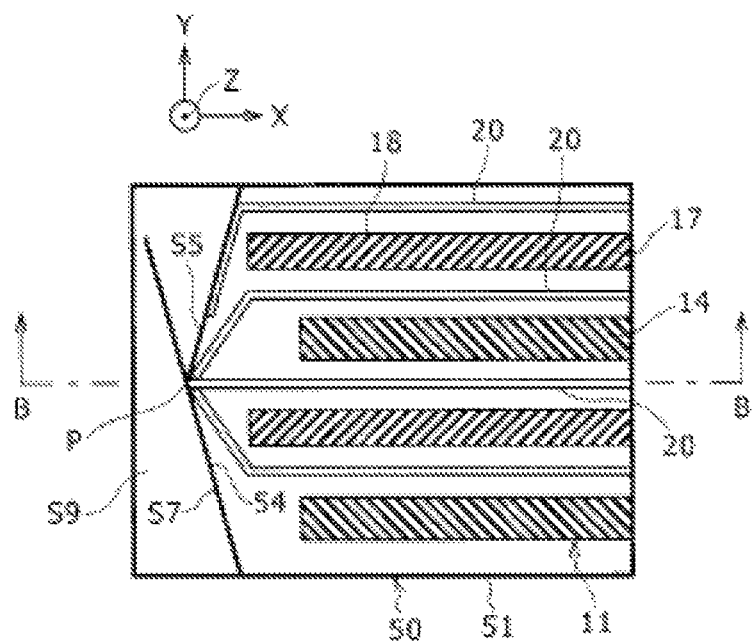
FIG. 5 is a schematic diagram corresponding to a half portion of the insulating holder and an electrode assembly in a section A-A in FIG. 2.

Referring to FIG. 5 which will be described later, each positive electrode plate 14, each negative electrode plate 17 and the separator 20 are sheets having a substantially rectangular shape. The electrode assembly 11 is constituted by these substantially rectangular sheets being stacked.

Note that a plurality of electrode assemblies may be disposed in a stacked direction of the substantially rectangular sheets inside the exterior case 60 and the insulating holder 50, and the plurality of electrode assemblies may be electrically connected in parallel. In this event, the plurality of electrode assemblies are stored inside the exterior case 60 in a state where the electrode assemblies are immersed into the electrolyte. Further, while not illustrated, the electrode assembly 11 may be formed in a flat shape by alternately inserting the respective positive electrode plates 14 and the respective negative electrode plates 17 between folds of the elongated separator which is folded in a zig-zag manner in a Z shape. Alternatively, the electrode assembly 11 may be formed in a flat shape by winding an elongated positive electrode plate and an elongated negative electrode plate via an elongated separator. These electrode assemblies can be also stored inside the exterior case 60 in a state where a plurality of the electrode assemblies is electrically connected in parallel.

The positive electrode plate 14 has a positive electrode body 15 (FIG. 5) in which an active material mixture layer is formed on side faces of both front and back sides of a rectangular positive core formed with a metallic foil, for example, an aluminum foil. A positive electrode tab 16 is formed on the positive electrode plate 14. Part of the positive core extends from an upper end portion on one side (right side in FIG. 1) in the longitudinal direction X of the positive electrode body 15, and this extending portion constitutes the positive electrode tab 16. The positive electrode tab 16 is electrically connected to the positive electrode terminal 71 fixed at the sealing assembly 70 via a positive core 75.

The active material mixture layer of the positive electrode plate 14 includes, for example, an active material, a conductive agent, and a binding agent. Lithium-nickel-cobalt-manganese composite oxide can be used as the active material of the positive electrode plate 14, polyvinylidene fluoride (PVdF) can be used as the binding agent, a carbon material can be used as the conductive agent, and N-methyl-2-pyrrolidone (NMP) can be used as a disperse medium.

A manufacturing method of the positive electrode plate 14 will be described. First, a slurry including the above-described active material, conductive agent, binding agent and disperse medium is prepared. This slurry is applied to both sides of the positive core. Then, the disperse medium in the slurry is removed by drying this, to form an active material mixture layer on the positive core. Thereafter, compression treatment is performed so that the active material mixture layer has a predetermined thickness. The positive electrode plate 14 obtained in this manner is cut in a predetermined shape.

The negative electrode plate 17 has a negative electrode body 18 (FIG. 5) in which an active material mixture layer is formed on side faces of both front and back sides of a rectangular negative core formed with a metallic foil, for example, a copper foil. A negative electrode tab 19 is formed on the negative electrode plate 17. On the other side (left side in FIG. 1) in the longitudinal direction X of the negative electrode body 18, part of the negative core extends from an upper end portion, and this extending portion constitutes the negative electrode tab 19. The negative electrode tab 19 is electrically connected to a negative electrode terminal 72 fixed at the sealing assembly 70 via a negative core 80.

The active material mixture layer of the negative electrode plate 17 includes, for example, an active material, a binding agent and a thickening agent. Black lead can be used as the active material of the negative electrode plate 17, styrene-butadiene rubber (SBR) can be used as the binding agent, carboxymethyl cellulose (CMC) can be used as the thickening agent, and water can be used as a disperse medium. Note that the active material mixture layer of the negative electrode plate 17 may contain a conductive agent as necessary.

A manufacturing method of the negative electrode plate 17 will be described. First, a slurry including the above-described active material, binding agent and thickening agent is prepared. This slurry is applied to both sides of the negative core. Then, the disperse medium in the slurry is removed by drying this, to form an active material mixture layer on the negative core. Thereafter, compression treatment is performed so that the active material mixture layer has a predetermined thickness. The negative electrode plate 17 obtained in this manner is cut in a predetermined shape.

For example, a separator formed with a resin can be used as the separator 20, and polyolefin, polyethylene or polypropylene can be used as the resin. The separator 20 has a plurality of layers including two porous layers formed with different materials. For example, the whole of the separator 20 can be made to have a plurality of layers by at least one or more porous layers formed with a different material from a material of a porous separator body being formed on one side or both sides of the separator body. For example, the porous layers formed at the separator 20 may include at least one of the group consisting of polyvinylidene fluoride, an acrylic resin, polyvinyl alcohol, hexafluoropropylene, styrene-butadiene rubber, polyimide, aramid, polyamide-imide, metal oxide containing Al and metal oxide containing Ti.

A manufacturing method of the separator 20 will be described. For example, 50 mass % of polyvinylidene fluoride is mixed with 50 mass % of aluminum oxide, and an appropriate amount of N-methyl-2-pyrrolidone (NMP) is further added to prepare a slurry for porous layer. Then, the above-described slurry for porous layer is applied to the whole of a resin base material which forms the separator body, which is formed with polyethylene, and which has a thickness of 12 μm, and dried to form porous layers, to thereby manufacture the separator 20. Note that mass % of polyvinylidene fluoride and aluminum oxide is not limited to the above-described mass %, and the separator 20 can be similarly manufactured also in a case where aluminum hydroxide or aluminum hydroxide oxide is used in place of aluminum oxide.

As illustrated in FIG. 5 which will be described later, in planar view from a stacked direction (vertical direction in FIG. 5) of the positive electrode plates 14 and the negative electrode plates 17 which face each other via the separators 20 inside the electrode assembly 11, the negative electrode plate 17 may be larger than the positive electrode plate 14 except portions of the positive electrode tab and the negative electrode tab, and a periphery of the positive electrode plate 14 may be positioned inside a periphery of the negative electrode plate 17. This configuration can prevent lithium ions from being precipitated at the negative electrode plate 17.

Further, a length of each separator 20 in the longitudinal direction X is longer than lengths of the positive electrode plate 14 and the negative electrode plate 17 in the longitudinal direction X. Still further, both end portions of each separator 20 in the longitudinal direction X are exposed to protrude from end faces of the positive electrode plate 14, an core at the negative electrode plate 17 and the active material mixture layer. Such an exposed portion which is at least part of the separator 20 is pushed by both end portions in the longitudinal direction X of the insulating holder 50 which will be described later and folded. Further, portions of at least one of the separators 20, exposed from the end faces of the core and the active material mixture layer at the positive electrode plate 14 and the negative electrode plate 17, is in contact with a vicinity of a base line P (FIG. 5) of a valley portion 54 (FIG. 5) having a V shape formed by the insulating sheet 51. FIG. 5 schematically illustrates that the valley portion 54 is formed by a portion where a fifth sheet element S5 and a seventh sheet element S7 which are two sheet elements of the insulating sheet 51 are folded to overlap with each other being slightly open at the insulating holder 50. This makes it easier to soak up a surplus liquid of an electrolyte accumulating near a bottom portion of the exterior case 60 as will be described later through a minute gap between the insulating holder 50 and the insulating sheet 51 by capillary action. This allows the surplus liquid of the electrolyte to more easily penetrate into most part of the electrode assembly 11.

The positive core 75 is, for example, formed of an aluminum plate material. The positive core 75 has one end which is connected to the positive electrode tab 16 and the other end which is connected to the positive electrode terminal 71. In this event, the positive electrode terminal 71 is electrically connected to the positive core 75 via a current breaker. The current breaker is a safety device which can cut electrical connection between the positive core 75 and the positive electrode terminal 71 when a gas is generated inside the exterior case 60 upon abnormal time of the secondary battery 10 and a pressure inside the exterior case 60 exceeds a predetermined pressure. The current breaker has, for example, an inverting plate which is connected to the other end of the positive core 75 and which deforms in a direction separate from the positive core 75 upon receipt of a pressure inside the exterior case 60, and a cup-shaped conductive member which electrically connects the inverting plate and the positive electrode terminal 71. The positive electrode terminal 71 is connected to an upper portion of the conductive member, and the positive electrode terminal 71 is fixed at the sealing assembly 70.

The negative core 80 is, for example, formed of a copper plate material. The negative core 80 has one end which is connected to the negative electrode tab 19 and the other end which is connected to the negative electrode terminal 72. The negative electrode terminal 72 is fixed at the sealing assembly 70. The negative core 80 may be fixed at the sealing assembly 70, for example, by the negative electrode terminal 72.

Each of the positive core and the negative core may be an integrated member or may be constituted by a plurality of members being connected.

The positive electrode terminal 71 passes through a terminal hole of the sealing assembly 70 and has one end which is exposed to outside of the exterior case 60 and the other end which is stored inside the exterior case 60. The positive electrode terminal 71 is fixed at a cup-shaped conductive member by the other end being inserted into a connection hole provided on an upper surface of the cup-shaped conductive member and the other end of the positive electrode terminal 71 being swaged so as to expand in a radial direction. The positive electrode terminal 71 is, for example, formed of an aluminum cylinder.

The negative electrode terminal 72 passes through the terminal hole of the sealing assembly 70 and has one end which is exposed to outside of the exterior case 60 and the other end which is stored inside the exterior case 60. The negative electrode terminal 72 may be, for example, formed of a clad material having one end formed with a copper material which is connected to the negative core 80 inside the exterior case 60 and the other end formed with aluminum which is exposed to outside of the exterior case 60. The negative electrode terminal 72 is fixed at the sealing assembly 70 along with the negative core 80 by the other end of the negative electrode terminal 72 being swaged so as to expand in a radial direction.

The sealing assembly 70 is, for example, formed by processing an aluminum plate. The sealing assembly 70 is positioned on the opening 61 of the exterior case 60. The sealing assembly 70 can seal inside of the exterior case 60 by being welded at an opening end of the exterior case 60 using, for example, laser. The sealing assembly 70 may have an injection hole for injecting the electrolyte into the exterior case 60. An injection plug which plugs the injection hole may be provided at the sealing assembly 70. Further, the sealing assembly 70 may be provided with a gas discharge valve 70a which ruptures and discharges gas inside the exterior case 60 to outside in a case where a pressure inside the exterior case 60 exceeds a predetermined pressure.

Note that in a case where the positive core 75 and the negative core 80 are directly or indirectly fixed at the sealing assembly 70 by the positive electrode terminal 71 and the negative electrode terminal 72 being respectively swaged, insulating members 81 and 82 may be put between the current collectors 75 and 80, and the sealing assembly 70. Further, insulating members may be put between the terminal hole, and the positive electrode terminal 71 and the negative electrode terminal 72, and between heads of the positive electrode terminal 71 and the negative electrode terminal 72 exposed on the sealing assembly 70 and the upper surface of the sealing assembly 70.

The exterior case 60, which is a square case, is formed of a metal such as aluminum. The exterior case 60 can be formed by performing squeeze process on, for example, an aluminum material. Each of a plurality of side walls 63 of the exterior case 60 are formed of two shorter side walls 63 having a short length in a lateral direction and two longer side walls (not illustrated) having a long length in the lateral direction. Each longer side wall faces an end face in a stacked direction of the electrode assembly 11 via the insulating holder 50 which will be described later. Meanwhile, each shorter side wall 63 faces a side end face in a direction orthogonal to the stacked direction of the electrode assembly 11 via the insulating holder 50.

Figure 2:
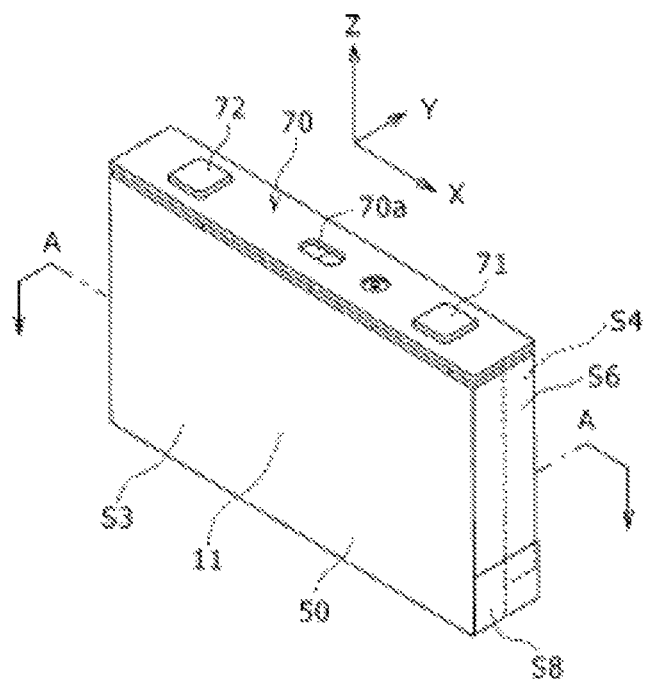
FIG. 2 is a perspective view illustrating the secondary battery illustrated in FIG. 1, in a state where an exterior case is removed.
Figure 3:
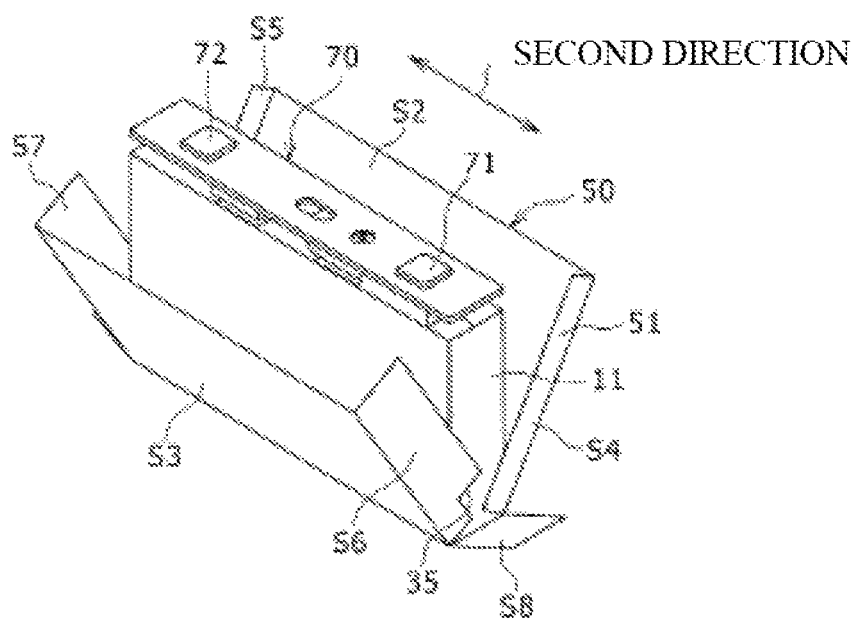
FIG. 3 is a perspective view illustrating a state where an insulating holder is being assembled in FIG. 2.

As illustrated in FIG. 2 and FIG. 3, the insulating holder 50 is a storage body which is formed by folding the insulating sheet 51 formed with an insulating material so that part of the insulating sheet 51 overlaps with each other, and which stores the electrode assembly 11.

The insulating holder 50 has a substantially box shape which is flat, which has a bottom portion and is open at an upper end in an assembly state. The insulating holder 50 has a rectangular shape when viewed from the front side and the side. The insulating holder 50 may have a shape of a square case so as to fit internal space of the exterior case 60. As the insulating sheet 51 which constitutes the insulating holder 50, for example, a sheet formed with an insulating material such as a resin can be used. For example, polypropylene can be used as a sheet formed with a resin. The thickness of the insulating sheet 51 falls within a range from, for example, 100 μm to 200 μm. The insulating holder 50 is disposed between the exterior case 60 and the electrode assembly 11 and electrically insulates the exterior case 60 from the electrode assembly 11 in a state where the insulating holder 50 stores the electrode assembly 11.

Figure 4:
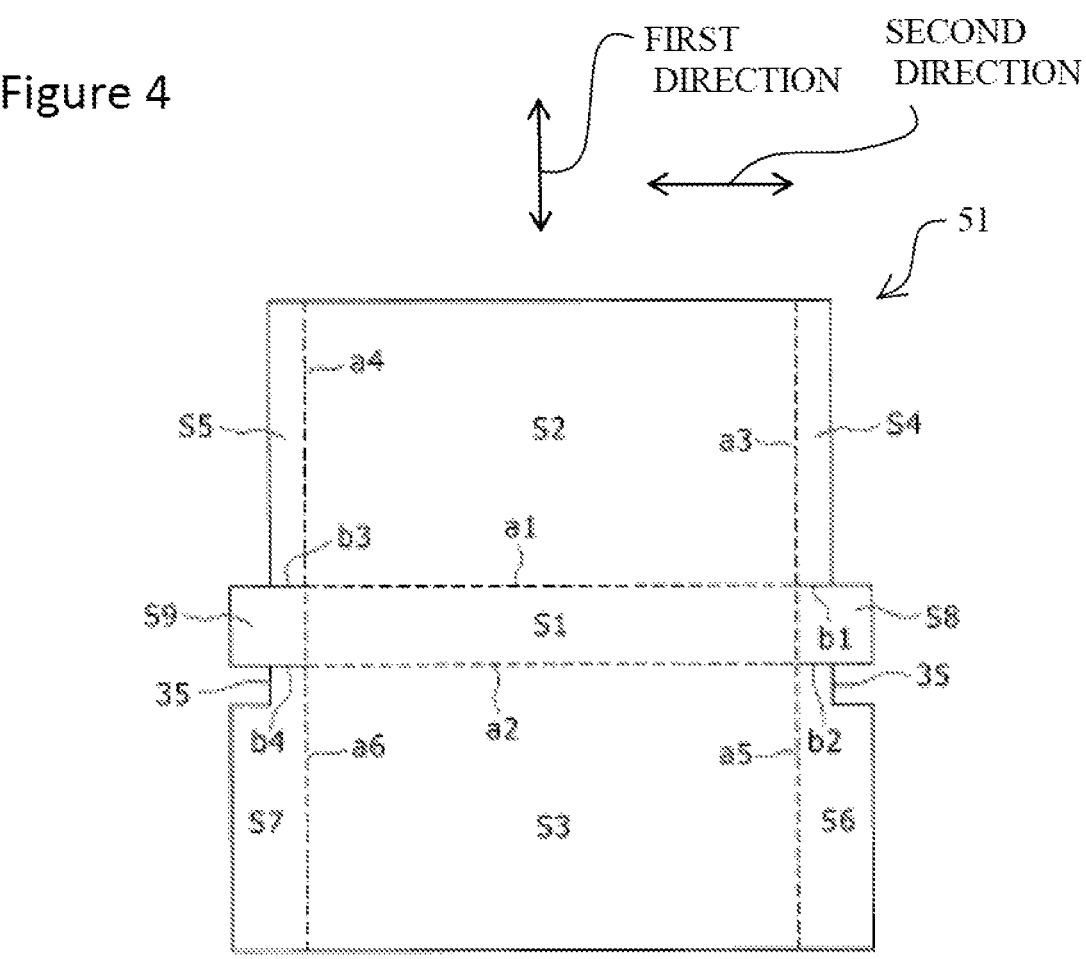
FIG. 4 is a development of an insulating sheet before the insulating holder illustrated in FIG. 2 is assembled.

FIG. 4 is a development illustrating the insulating sheet 51 before the insulating holder 50 is assembled. The insulating sheet 51 has a substantially rectangular shape as a whole and is formed of a plurality of sheet elements segmented by a plurality of fold lines (dashed lines a1 to a6) and a plurality of cut lines (solid lines b1 to b4). Specifically, the insulating sheet 51 is formed of first to ninth sheet elements S1 to S9. Each of the sheet elements S1 to S9 has a rectangular shape or a substantially rectangular shape with a cutout part. The first sheet element S1 is positioned at an intermediate part of the insulating sheet 51 and faces a bottom face 62 of the exterior case 60 of the insulating holder 50. The first sheet element has a rectangular shape having a length in a first direction (vertical direction in FIG. 4) shorter than a length in a second direction (horizontal direction in FIG. 4). The second direction is orthogonal to the first direction.

The second sheet element S2 extends from one end (upper end in FIG. 4) in the first direction of the first sheet element S1. The third sheet element S3 extends from the other end in the first direction of the first sheet element S1.

The fourth sheet element S4 extends from one end in the second direction (right end in FIG. 4) of the second sheet element S2. The fifth sheet element S5 extends from the other end in the second direction (left end in FIG. 4) of the second sheet element S2.

The sixth sheet element S6 extends from one end in the second direction (right end in FIG. 4) of the third sheet element S3. The seventh sheet element S7 extends from the other end in the second direction (left end in FIG. 4) of the third sheet element S3.

The eighth sheet element S8 extends from one end in the second direction (right end in FIG. 4) of the first sheet element S1. The ninth sheet element S9 extends from the other end in the second direction (left end in FIG. 4) of the first sheet element S1.

Among the first to the ninth sheet elements S1 to S9, the first to the fifth sheet elements S1 to S5, and the eighth and the ninth sheet elements S8 and S9 have a rectangular shape. Meanwhile, rectangular shapes of the sixth and the seventh sheet elements S6 and S7 have cutouts 35 each formed by cutting out a portion in a rectangular shape on an outer end side in the second direction at a side end of the bottom face adjacent to the eighth sheet element S8 or the ninth sheet element S9. A length in the second direction of the fourth sheet element S4 is shorter than a length in the second direction of the sixth sheet element S6 which is to overlap with the fourth sheet element S4. A length in the second direction of the fifth sheet element S5 is shorter than a length in the second direction of the seventh sheet element S7 which is to overlap with the fifth sheet element S5.

Further, linear fold lines a1 to a6 are formed at boundaries of the first to the third sheet elements S1 to S3, boundaries of the second, the fourth and the fifth sheet elements S2, S4 and S5, and boundaries of the third, the sixth and the seventh sheet elements S3, S6 and S7. Further, linear fold lines a7 and a8 are formed at boundaries of the first sheet element S1 and the eighth and the ninth sheet elements S8 and S9. Meanwhile, linear cut lines b1 and b2 are formed at boundaries of the fourth and the sixth sheet elements S4 and S6, and the eighth sheet element S8. Further, linear cut lines b3 and b4 are also formed at boundaries of the fifth and the seventh sheet elements S5 and S7, and the ninth sheet element S9.

When the insulating holder 50 is formed, the first to the ninth sheet elements S1 to S9 are folded at the fold lines a1 to a6 which are bent parts provided at the boundaries.

By this means, the insulating holder 50 has a bottom face portion formed with the first sheet element S1 and four side face portions which are formed with the second to the ninth sheet elements S2 to S9 and which rise from the bottom face portion. At the insulating holder 50, an opening surrounded by end portions of the four side face portions are formed at an end opposite to the bottom face portion. Two side face portions formed with the second and the third sheet elements S2 and S3 face both end faces in the stacked direction of the electrode assembly 11.

Portions where two sheets or three sheets overlap with each other face both ends in the longitudinal direction corresponding to the second direction of the electrode assembly 11. Specifically, a portion where the fourth and the sixth sheet elements S4 and S6 overlap or a portion where the fourth, the sixth and the eighth sheet elements S4, S6 and S8 overlap faces one end in the longitudinal direction (right end in FIG. 2 and FIG. 3) of the electrode assembly 11. The sixth sheet element S6 overlaps on an outer side of the fourth sheet element S4, and the eighth sheet element S8 overlaps on an outer side of a lower end portion of the overlapping portion. In this event, shapes of the fourth and the sixth sheet elements S4 and S6 of the insulating sheet 51, which are two sheet elements overlapping at one end in the longitudinal direction of the electrode assembly 11 are asymmetric. By this means, in a case where the overlapping portions of the insulating sheet 51 tend to be developed as will be described later, a V-shaped valley portion is formed by the fourth and the sixth sheet elements S4 and S6, and a base line of the valley portion is more likely to be disposed near the center in the stacked direction of the electrode assembly 11.

Further, a portion where the fifth and the seventh sheet elements S5 and S7 overlap or a portion where the fifth, the seventh and the ninth sheet elements S5, S7 and S9 overlap faces the other end in the longitudinal direction (left end in FIG. 2 and FIG. 3) of the electrode assembly 11. The seventh sheet element S7 overlaps on an outer side of the fifth sheet element S5, and the ninth sheet element S9 overlaps on an outer side of a lower end portion of the overlapping portion. In this event, shapes of the fifth and the seventh sheet elements S5 and S7 of the insulating sheet 51, which are two sheet elements overlapping at the other end in the longitudinal direction of the electrode assembly 11 are asymmetric. By this means, in a case where the overlapping portions of the insulating sheet 51 tend to be developed as will be described later, a V-shaped valley portion 54 (FIG. 5) is formed by the fifth and the seventh sheet elements S5 and S7, and a base line P (FIG. 5) of the valley portion 54 is more likely to be disposed near the center in the stacked direction (vertical direction in FIG. 5) of the electrode assembly 11.

As illustrated in FIG. 4, cutouts 35 are formed at end portions on the bottom face side of the sixth sheet element S6 and the seventh sheet element S7. The eighth sheet element S8 is superimposed on the sixth sheet element S6, and the ninth sheet element S9 is superimposed on the seventh sheet element S7. By this means, two sheet elements overlap at an end portion on the bottom face side of the side face portion facing one end in the longitudinal direction of the electrode assembly 11 at the insulating holder 50. The sixth sheet element S6 does not overlap with the fourth sheet element S4 at the end portion on the bottom face side because of the cutout 35 and because the length in the second direction of the fourth sheet element S4 is shorter than the length in the second direction of the sixth sheet element S6. Further, also at the end portion on the bottom face side of the side face portion facing the other end in the longitudinal direction of the electrode assembly 11, two sheet elements overlap at the insulating holder 50. The seventh sheet element S7 does not overlap with the fifth sheet element S5 at the end portion on the bottom face side because of the cutout 35 and because the length in the second direction of the fifth sheet element S5 is shorter than the length in the second direction of the seventh sheet element S7. By this means, in a case where corner portions of the insulating holder 50 abut on curve faces at corner portions on the bottom face side at both ends in the longitudinal direction of the exterior case 60 by the insulating holder 50 and the electrode assembly 11 being stored inside the exterior case 60, it is possible to prevent concentration of stress inside the electrode assembly 11.

Figure 6:
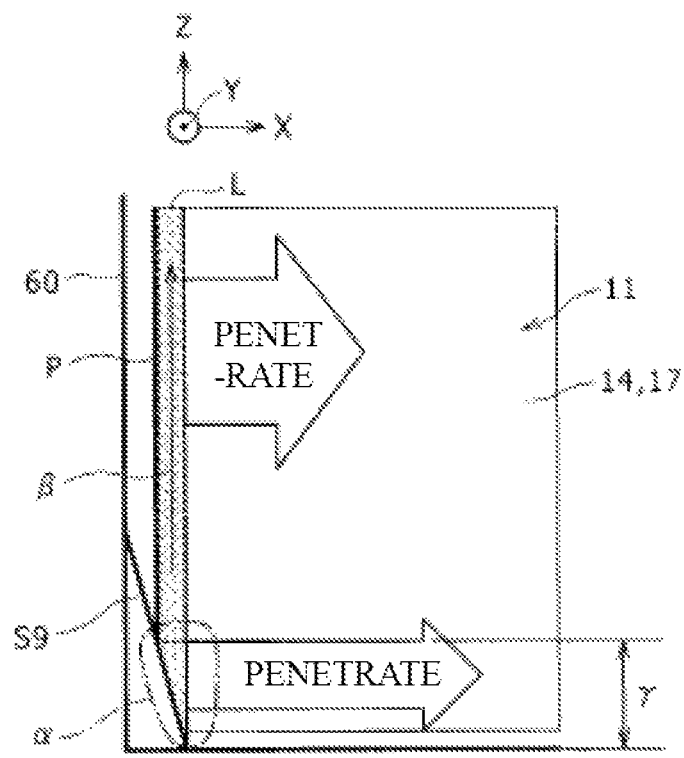
FIG. 6 is a schematic diagram corresponding to a section B-B in FIG. 5 indicating that a surplus liquid of an electrolyte penetrates into most part in a vertical direction of the electrode assembly in the embodiment.

FIG. 5 is a schematic diagram corresponding to a half portion of the insulating holder 50 and the electrode assembly 11 in a section A-A in FIG. 2. FIG. 6 is a schematic diagram corresponding to a section B-B in FIG. 5 indicating that a surplus liquid of the electrolyte penetrates into most part in the vertical direction of the electrode assembly 11 in the embodiment.

As illustrated in FIG. 5, the other end portion (left end portion in FIG. 5) in the longitudinal direction X of each separator 20 is exposed from the end faces of the positive electrode plate 14, an core at the negative electrode 17, and the active material mixture layer. The exposed portion of the separator 20 is pushed by the other end portion (left end portion in FIG. 5) in the longitudinal direction X of the insulating holder 50 and folded. Then, the portion of at least one of the separators 20, exposed from the end faces of the core and the active material mixture layer at the positive electrode plate 14 and the negative electrode plate 17, is in contact with a vicinity of a base line P of the valley portion 54 formed by the insulating sheet 51. Further, as a result of the two sheet elements positioned at the other ends in the longitudinal direction X of the insulating holder becoming asymmetric, for example, the length in the second direction corresponding to the length in the thickness direction Y of the fifth sheet element S5 becoming approximately half of the length in the second direction of the seventh sheet element S7, the both end portions in the longitudinal direction X of the insulating holder 50 forms the V-shaped valley portion 54, the overlapping portions of the insulating holder 50 are easily open so that the base line P of the valley portion 54 is positioned at substantially the center in the stacked direction of the electrode assembly 11. Further, the separator 20 other than the separator 20 at the center in the stacked direction among the separators 20 is easily folded so that a tip of the portion exposed from the end faces of the positive electrode plate 14, the core at the negative electrode plate 17, and the active material mixture layer comes close to the center in the stacked direction of the electrode assembly 11. While FIG. 5 is a view corresponding to the half portion on the other end side in the longitudinal direction of a section of the insulating holder 50 and the electrode assembly 11, the half portion on one end side in the longitudinal direction is similar to the half portion on the other end side in the longitudinal direction. Thus, both end portions in the longitudinal direction X of each separator 20 are exposed from the end faces of the core and the active material mixture layer at the positive electrode plate 14 and the negative electrode plate 17, and a portion exposed from the end face among at least one end portion of the separator 20 is in contact with a vicinity of the base line P of the valley portion 54. This allows the surplus liquid of the electrolyte existing between the insulating holder 50 and the end portions of the electrode assembly 11 to more easily penetrate into most part of the electrode assembly 11.

Specifically, if the exterior case 60 stores the insulating holder 50 in a state where the insulating holder 50 stores the electrode assembly 11, there is a possibility that the eighth and the ninth sheet elements S8 and S9 which are located at a bottom portion at outermost ends of both ends in the longitudinal direction X of the insulating holder 50 may fall outward. For example, as illustrated in FIG. 6, there is a possibility that the ninth sheet element S9 may fall outward and separate from the other ends (left end in FIG. 6) in the longitudinal direction of the positive electrode plate 14 and the negative electrode plate 17 of the electrode assembly 11. In this event, as illustrated in FIG. 5, there is a case where the fifth and the seventh sheet elements S5 and S7 of the insulating holder 50 may also respectively separate from the other ends (left end in FIG. 6) in the longitudinal direction of the positive electrode plate 14 and the negative electrode plate 17 of the electrode assembly 11 and may form the valley portion 54. Then, there is a case where the electrolyte indicated with a sandy portion enclosed with a frame a of a dashed-dotted line in FIG. 6 may exist as the surplus liquid protruding from between the positive electrode 14 and the negative electrode 17 of the electrode assembly 11. In this case, in a configuration in the present example, as illustrated in FIG. 5, portions of at least one of the separators 20, exposed from the end faces of the positive electrode plate 14 and the negative electrode plate 17 are in contact with a vicinity of the base line P of the valley portion 54 formed by the insulating sheet 51. By this means, a gap becomes smaller as a result of the separator 20 entering into a gap between the end faces of the positive electrode plate 14 and the negative electrode plate 17, and the insulating holder 50, and a minute gap is likely to be formed between the separator 20 and the insulating holder 50 near the base line P. This makes it easier to soak up the surplus liquid upward as indicated with an arrow β by capillary action. Thus, a liquid level L (FIG. 6) of the surplus liquid rises, and the surplus liquid is more likely to penetrate into most part in the vertical direction of the electrode assembly 11 also including an upper side portion as well as a lower end portion (a portion in a range indicated with an arrow γ in FIG. 6) between the end faces of the positive electrode plate 14 and the negative electrode plate 17. Thus, the surplus is more likely to penetrate into most part of the electrode assembly 11. As a result, more favorable electrolyte can be used for battery reaction of the electrode assembly 11, so that it is possible to improve capacity retention of the secondary battery.

Further, in the embodiment, the separator 20 has at least one or more porous layers formed at the separator body. This makes it easier for the electrolyte to be absorbed into the separator 20 as the surplus liquid, which makes it easier to soak up the surplus liquid upward from space between the separator 20 and the insulating holder 50. By this means, the surplus liquid is more likely to penetrate into most part of the electrode assembly 11.

Figure 7:
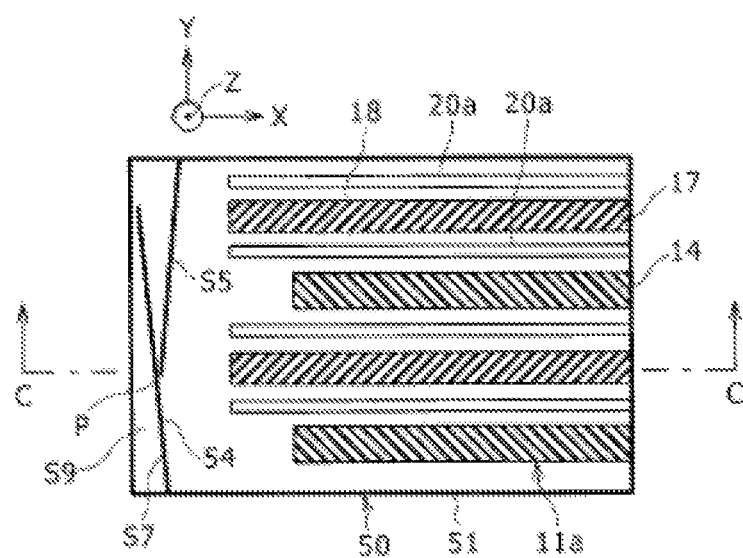
FIG. 7 is a view corresponding to FIG. 5 illustrating a stacked secondary battery in a comparative example.
Figure 8:
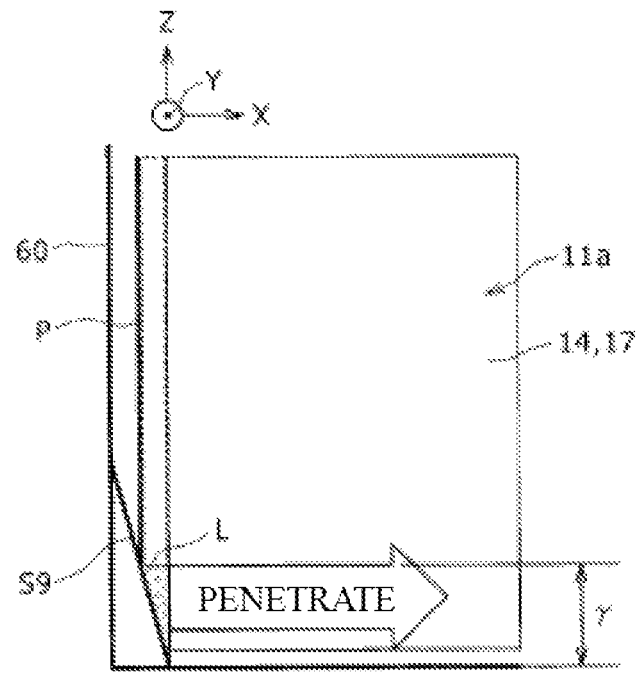
FIG. 8 is a schematic diagram corresponding to a section C-C in FIG. 7 indicating that a surplus liquid of an electrolyte penetrates only into a lower end portion of an electrode assembly in the stacked secondary battery in the comparative example.

FIG. 7 is a view corresponding to FIG. 5, illustrating a secondary battery in a comparative example. FIG. 8 is a schematic diagram corresponding to a section C-C in FIG. 7, indicating that the surplus liquid of the electrolyte penetrates only into a lower end portion of the electrode assembly 11a in the secondary battery in the comparative example. The comparative example is different from the embodiment in FIG. 1 to FIG. 6, and the length in the longitudinal direction X of each separator 20a of the electrode assembly 11a matches the length in the longitudinal direction X of the negative electrode plate 17. By this means, both end portions in the longitudinal direction X of each separator 20a do not protrude and are not exposed from the end faces of the core and the active material mixture layer at the negative electrode plate 17. Thus, each separator 20a is not in contact with the vicinity of the base line P of the valley portion 54 formed by the insulating sheet 51. Thus, in a case where the eighth and the ninth sheet elements S8 and S9 of the insulating holder 50 fall outward and the valley portion 54 is formed by the insulating sheet 51 as illustrated in FIG. 7 and FIG. 8, there is a possibility that a relatively large gap may be formed between an inner surface of the valley portion 54 and the end face in the longitudinal direction of the electrode assembly 11a. In this event, in a case where the electrolyte exists as the surplus liquid protruding from space between the positive electrode plate 14 and the negative electrode plate 17 of the electrode assembly 11a as indicated with a sandy portion in FIG. 8, the liquid level L (FIG. 8) of the surplus liquid is located at a low position close to the bottom face of the exterior case 60. Thus, as illustrated in FIG. 8, the surplus liquid is more likely to penetrate into a lower end portion (portion in a range indicated with the arrow γ FIG. 8) of the electrode assembly 11a but is less likely to penetrate into most part in the vertical direction including an upper side portion of the electrode assembly 11a. Thus, the comparative example has room for improvement in terms of penetration of the surplus liquid into most part of the electrode assembly 11a. By this means, in the comparative example, in a case where a charge and discharge cycle is repeated, the surplus liquid existing at the bottom portion of the exterior case 60 is less likely to be soaked upward when a number of cycles are finished (end of the cycles). Thus, the comparative example has room for improvement in terms of improvement in capacity retention of the secondary battery.

The present inventor performed experiments to compare capacity retention after respective charge and discharge cycles have elapsed in a case where full charging capacity in an initial charge and discharge cycle is set at 100%, between the secondary battery in the example corresponding to the embodiment illustrated in FIG. 1 to FIG. 6 and the secondary battery in the comparative example illustrated in FIG. 7 and FIG. 8 to confirm effects of the embodiment. The respective secondary batteries were set to have the same initial full charging capacity. Further, in each charge and discharge cycle, constant current charge was performed with 0.5 It in a case where a predetermined current value is 1 It until battery voltages of the respective secondary batteries became a predetermined end-of-charge voltage (CC charge). The charging capacity measured at this time is full charging capacity in the charge and discharge cycle. After charge, constant current discharge was performed with 1 It until the battery voltages of the secondary batteries became a predetermined end-of-discharge voltage (CC discharge).

Then, the number of cycles when capacity retention rapidly decreased was obtained in a graph where capacity retention when the respective charge and discharge cycles have elapsed was plotted in each of the above-described example and the comparative example. Cycle characteristics are higher as the number of cycles is larger.

Figure 9:
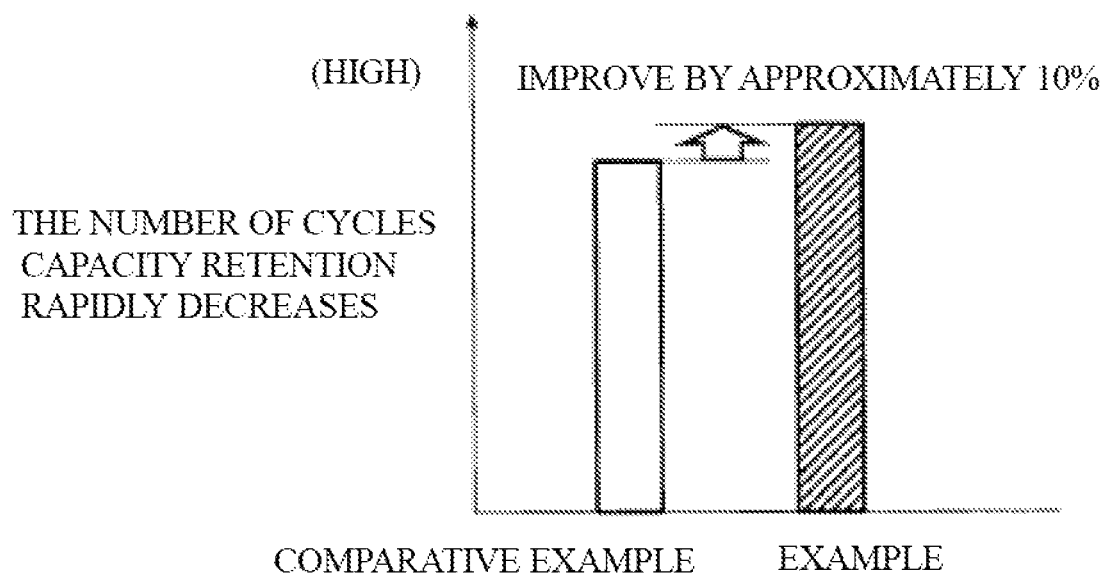
FIG. 9 is a graph indicating a result obtained by comparing the number of cycles between the stacked secondary battery in the embodiment and the stacked secondary battery in the comparative example in a case where capacity retention rapidly decreases.

FIG. 9 is a graph indicating a result of comparing the number of cycles (the number of cycles that capacity rapidly decreased) when the capacity retention rapidly decreased in the stacked secondary batteries in the example and the comparative example. As illustrated in FIG. 9, it was found that the number of cycles that capacity rapidly decreased in the example was improved by approximately 10% from the number of cycles that capacity rapidly decreased in the comparative example. This is because in the example, the electrolyte as the surplus liquid existing outside the electrode assembly 11 inside the secondary battery 10 could be soaked up to a minute gap between the insulating holder 50 and the separator 20 and could easily penetrate into most part of the electrode assembly 11 as described above. From this, effects of the embodiment could be confirmed.

Note that while a case has been described in the configuration in FIG. 1 to FIG. 6 where the cutouts 35 (FIG. 4) are formed at part of the sheet elements of the insulating holder 50, the sheet elements may be made to have a simple rectangular shape without the cutouts of the sheet elements being formed.

Figure 10:
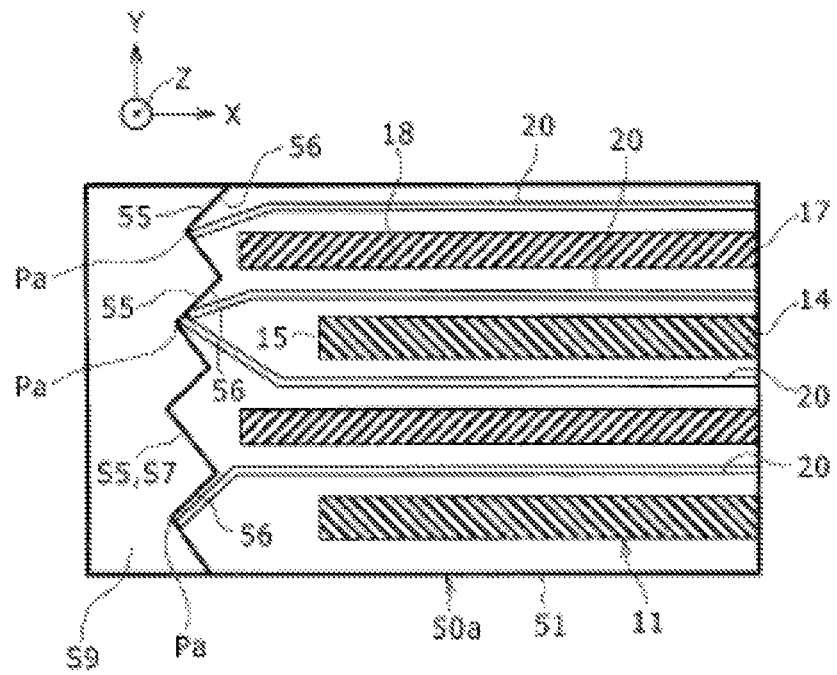
FIG. 10 is a view corresponding to FIG. 5 illustrating a stacked secondary battery in another example of the embodiment.

FIG. 10 is a view corresponding to FIG. 5, illustrating a secondary battery in another example of the embodiment. In a configuration of the present example, portions of the insulating sheet 51 forming the insulating holder 50a, which face the end portions in the longitudinal direction X of the respective separators 20 are shaped into folds in a zig-zag manner such that a plurality of chevron portions 55 continue. For example, each of the fifth and the seventh sheet elements S5 and S7 and the fourth and the sixth sheet elements (not illustrated) of the insulating holder 50a is shaped into folds, and the fifth sheet element S5 overlaps with the seventh sheet element S7 and the fourth sheet element overlaps with the sixth sheet element so that respective shapes match each other. Further, FIG. 10 illustrates a state where the fifth and the seventh sheet elements S5 and S7 have the same shape and overlap with each other like one sheet element. In this event, the cutouts 35 (FIG. 4) may be formed at lower end portions of the fifth and the seventh sheet elements S5 and S7, or the fifth and the seventh sheet elements S5 and S7 may have a simple rectangular shape without the cutouts being formed. The fourth and the sixth sheet elements which are not illustrated in FIG. 10 have similar shapes. Further, portions of at least one of the separators 20, exposed from end faces of the positive electrode plate 14, the core at the negative electrode plate 17, and the active material mixture layer are in contact with vicinities of a base line Pa of a plurality of valley portions 56 formed on the electrode assembly 11 side of the folded portion formed by the insulating sheet 51.

Also in the configuration in the present example, in a similar manner to the configuration in FIG. 1 to FIG. 6, a minute gap is formed between the insulating holder 50 and the separator 20, and this minute gap makes it easier to soak up the electrolyte. In the present example, portions of the insulating sheet 51, which face end portions in the longitudinal direction X of the respective separators 20 are shaped into folds as described above, so that the end portions of different separators 20 are more likely to be in contact with the vicinities of the base line Pa of the plurality of valley portions 56. In the present example, other configurations and operation are similar to the configuration in FIG. 1 to FIG. 6.

Figure 11:
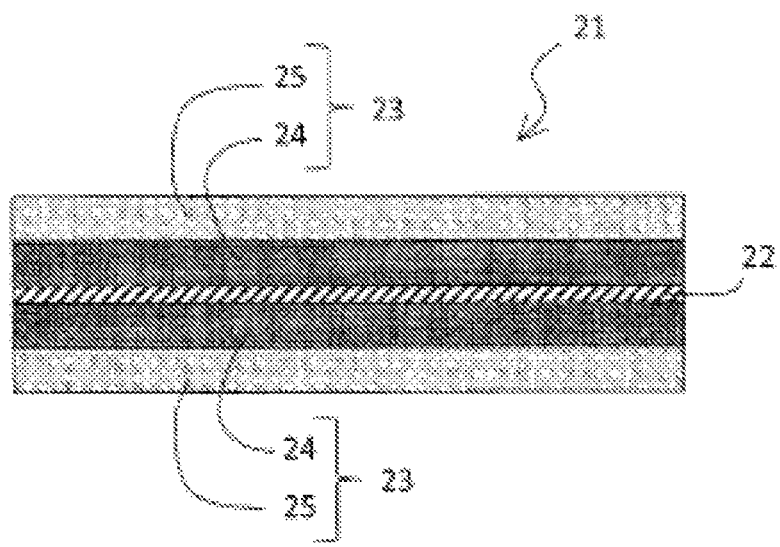
FIG. 11 is a sectional view of a negative electrode plate constituting the stacked secondary battery in another example of the embodiment.

FIG. 11 is a sectional view of a negative electrode plate 21 which constitutes a secondary battery in another example of the embodiment. The negative electrode plate 21 includes active material mixture layers 23 formed on both side faces of the negative core 22. Each of the active material mixture layers 23 has a first active material layer 24 and a second active material layer 25 formed on the first active material layer 24.

The first active material layer 24 on the negative core 22 side can be made to have higher density than the second active material layer 25 on an outer side. This allows the electrolyte to more easily penetrate into a surface side of the active material mixture layer 23. Further, voids of the first active material layer 24 may be made smaller than voids of the second material layer 25. Further, a material of the first active material layer 24 may be made different from a material of the second active material layer 25. The first active material layer 24 is, for example, a layer including a carbon-based active material, an Si-based active material, polyacrylic acid or salt thereof, and fibrous carbon. By this means, the first active material layer 24 is formed with a material including silicon. The second active material layer 25 is a layer which includes less Si-based active material than the first active material layer 24 or a layer which substantially include no Si-based active material. The second active material layer 25 preferably includes only a carbon-based active material as a negative electrode active material in terms of improvement of battery input characteristics, or the like, and preferably include substantially no Si-based active material (for example, less than 0.1 mass % with respect to the mass of the second active material layer 25).

Note that while FIG. 11 illustrates a case where the active material mixture layer 23 comprised in the negative electrode plate 21 has the first and the second active material layers 24 and 25, the active material mixture layer comprised in the positive electrode plate may have the first and the second active material layers, in which case density of the first active material layer on the positive core side may be made higher than density of the second active material layer on an outer side. Further, in this case, in a similar manner to the negative electrode plate 21, voids of the first active material layer may be made smaller than voids of the second active material layer, or a material of the first active material layer may be made different from a material of the second active material layer. In the present example, other configurations and operation are similar to the configuration in FIG. 1 to FIG. 6 or FIG. 9 and FIG. 10.

REFERENCE SINGS LIST 10 stacked secondary battery (secondary battery), 11, 11a electrode assembly, 14 positive electrode plate, 15 positive electrode body, 16 positive electrode tab, 17 negative electrode plate, 18 negative electrode body, 19 negative electrode tab, 20, 20a separator, 21 negative electrode plate, 22 negative core, 23 active material mixture layer, 24 first active material layer, 25 second active material layer, 50, 50a insulating holder, 51 insulating sheet, 54 valley portion, 55 chevron portion, 56 valley portion, 60 exterior case, 61 opening, 62 bottom face, 63 side wall, 70 sealing assembly, 70a gas discharge valve, 71 positive electrode terminal, 72 negative electrode terminal, 75 positive core, 80 negative core, 81, 82 insulating member

The invention claimed is:

1. A stacked secondary battery, comprising:
   an electrode assembly in which at least one positive electrode plate and at least one negative electrode plate are stacked via a separator, the separator including a plurality of layers including two porous layers formed with different materials; and
   an exterior case which stores the electrode assembly, and an electrolyte together, wherein
   an insulating holder is formed by folding a sheet formed with an insulating material so that the sheet overlaps with each other,
   the exterior case has a bottom face, a plurality of side walls rising from the bottom face, and an opening which faces the bottom face and which is surrounded by the plurality of side walls, and a portion of the separator, which is exposed from end faces of cores formed with a metallic foil and active material mixture layers at the positive electrode plate and the negative electrode plate, is in contact with a vicinity of a base line of a valley portion formed by the sheet,
   wherein portions of the sheet, which face an end portion of the separator is shaped into folds such that a plurality of chevrons continue.

2. The stacked secondary battery according to claim 1, wherein shapes of two sheet elements which overlap with each other are asymmetric at the sheet.

3. The stacked secondary battery according to claim 1, wherein the electrode assembly includes an electrode having a first active material layer and a second active material layer formed on the first active material layer.

4. The stacked secondary battery according to claim 3, wherein the first active material layer has higher density than the second active material layer.

5. The stacked secondary battery according to claim 3, wherein the first active material layer has voids smaller than voids of the second active material layer.

6. The stacked secondary battery according to claim 3, wherein a material of the first active material layer is different from a material of the second active material layer.

7. The stacked secondary battery according to claim 3, wherein the electrode having the first active material layer and the second active material layer formed on the first active material layer is the negative electrode plate.

8. The stacked secondary battery according to claim 7, wherein the first active material layer is formed with a material including silicon.

9. The stacked secondary battery according to claim 1, wherein the separator includes at least one or more porous layers formed with a material different from a material of a separator body on one side or both sides of the separator body.

10. The stacked secondary battery according to claim 9, wherein the porous layers formed at the separator include at least one of the group consisting of polyvinylidene fluoride, an acrylic resin, polyvinyl alcohol, hexafluoropropylene, styrene-butadiene rubber, polyimide, aramid and polyamide-imide.

11. The stacked secondary battery according to claim 9, wherein the porous layers formed at the separator include metal oxide including Al.

12. The stacked secondary battery according to claim 9, wherein the porous layers formed at the separator include metal oxide including Ti.

* * * * *